US008463026B2

(12) United States Patent
Barros et al.

(10) Patent No.: US 8,463,026 B2
(45) Date of Patent: Jun. 11, 2013

(54) AUTOMATED IDENTIFICATION OF IMAGE OUTLIERS

(75) Inventors: Marcelo De Barros, Redmond, WA (US); Satya Pradeep Kanduri, Bellevue, WA (US); Nabeel Kaushal, Seattle, WA (US); Mikhail Parakhin, Redmond, WA (US); Manish Mittal, Redmond, WA (US); Adam Edlavitch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 12/975,684

(22) Filed: Dec. 22, 2010

(65) Prior Publication Data

US 2012/0163709 A1    Jun. 28, 2012

(51) Int. Cl.
*G06K 9/00* (2006.01)
(52) U.S. Cl.
USPC .......................................................... 382/162
(58) Field of Classification Search
None
See application file for complete search history.

(56) References Cited

U.S. PATENT DOCUMENTS

| 6,512,845 | B1 * | 1/2003 | Haikin et al. | 382/165 |
|---|---|---|---|---|
| 6,970,579 | B1 * | 11/2005 | Thornton | 382/115 |
| 2005/0180637 | A1 * | 8/2005 | Ikeda et al. | 382/224 |
| 2006/0085155 | A1 | 4/2006 | Miguelanez et al. | |
| 2006/0222244 | A1 * | 10/2006 | Haupt et al. | 382/220 |
| 2006/0251292 | A1 * | 11/2006 | Gokturk et al. | 382/103 |
| 2006/0251339 | A1 * | 11/2006 | Gokturk et al. | 382/305 |
| 2006/0253491 | A1 * | 11/2006 | Gokturk et al. | 707/104.1 |
| 2007/0078846 | A1 * | 4/2007 | Gulli et al. | 707/5 |
| 2007/0098266 | A1 * | 5/2007 | Chiu et al. | 382/224 |
| 2007/0217676 | A1 | 9/2007 | Grauman et al. | |
| 2007/0271226 | A1 * | 11/2007 | Zhang et al. | 707/3 |
| 2008/0089561 | A1 * | 4/2008 | Zhang | 382/118 |
| 2008/0126345 | A1 * | 5/2008 | Podilchuk | 707/5 |
| 2008/0260239 | A1 * | 10/2008 | Han et al. | 382/156 |
| 2009/0012723 | A1 | 1/2009 | Treado et al. | |
| 2010/0179759 | A1 | 7/2010 | Zheng et al. | |

OTHER PUBLICATIONS

Hardin, "Multivariate Outlier Detection and Robust Clustering with Minimum Covariance Determinant Estimation and S-Estimation," Ph.D. thesis, University of California, Davis, California, USA, 2000.*
Rocke, et al., "A Synthesis of Outlier Detection and Cluster Identification", Retrieved at << http://citeseerx.ist.psu.edu/viewdoc/download?doi=10.1.1.87.2336&rep=rep1&type=pdf >>, Sep. 2, 1999, pp. 1-23.

(Continued)

*Primary Examiner* — Wenpeng Chen
*Assistant Examiner* — Feng Niu (57) ABSTRACT

Outlier images—those images that differ substantially from other images in a set—can be automatically identified. One or more penalty values can be assigned to each image that quantifies how different that image is from others in the set. A threshold can be determined based on the set of penalty values. Each image whose penalty values are above the threshold is an outlier image. The penalty values can be the sum of per-pixel penalty values multiplied by the number of pixels with nonzero penalty values. A per-pixel penalty value can be the difference between a color value for that pixel and a predetermined range of color values, based on corresponding pixels in other images. The per-pixel penalty value can be determined for each component color and then optionally summed together. The threshold penalty values can be adjusted to provide for greater, or less, sensitivity to differences among the images.

19 Claims, 4 Drawing Sheets

OTHER PUBLICATIONS

He, et al., "Mining class outliers: concepts, algorithms and applications in CRM", Retrieved at << http://zengyouhe.googlepages.com/ESWA04.pdf >>, Expert Systems with Applications, vol. 27, No. 4, 2004, pp. 681-697.

Hardin, et al., "Outlier detection in the multiple cluster setting using the minimum covariance determinant estimator", Retrieved at << http://dmrocke.ucdavis.edu/papers/HardinRocke2004.pdf >>, Computational Statistics & Data Analysis, vol. 44, No. 4, 2004, pp. 625-638.

Xiong, et al., "Outlier Detection from Pooled Data for Image Retrieval System Evaluation", Retrieved at << ttp://ispl.korea.ac.kr/conference/ICASSP2007/pdfs/0100977.pdf >>, Proceedings of the IEEE International Conference on Acoustics, Speech and Signal Processing, Apr. 15-20, 2007, pp. I-977-I-980.

* cited by examiner

AUTOMATED IDENTIFICATION OF IMAGE OUTLIERS

BACKGROUND

The growth of interconnected networks of computing devices has enabled the sharing of data on a worldwide basis. To obtain such data, users typically utilize a "search engine" to search for data that is of interest to the users. The search engine utilizes the information provided by the user to identify, and then return to the user, data that is responsive to the information provided by the user. Typically, the information provided by the user is in the form of one or more terms describing the data that the user wishes to find. Likewise, the data that is identified, by the search engine, as being responsive to the user's query is, traditionally, hypertextual data comprising text, graphics, video and the like, as well as links to other data. However, in certain situations, the user wishes to find data of a specific type, such as, for example, images, videos, or files.

Because many people are adept at processing information visually, users often utilize search engines to search for images that are associated with one or more search terms. Such image-centric searches typically arise in one of two scenarios: either the user is looking for a graphic for entertainment or educational purposes, or the user is searching for a specific product that the user can identify visually.

In the first scenario, the images identified by the search engine as being responsive to the user's query can vary substantially. For example, a student searching for a picture of George Washington may be presented, by the search engine, with a wide variety of pictures including, for example, individual portraits of George Washington, paintings where George Washington is depicted with others, and images of structures, such as, for example, the Washington Monument. Similarly, as another example, a tourist searching for images associated with Paris, France may be presented, by the search engine, with a wide variety of images including, for example, images of famous Parisian landmarks, such as the Eiffel Tower, pictures taken by other tourists of themselves in Paris, and panoramic images of Paris.

By contrast, in the second scenario, where a user is searching for a specific product, the images identified by the search engine as being responsive to the user's query can be substantially more similar to one another. Typically, a user seeking to buy a particular product, or a user seeking information about a particular product, provides, to the search engine, much more specific information, thereby enabling the search engine to more precisely identify responsive images. For example, users looking for a product can provide, to the search engine, a product identification code, a trademarked name, or other detailed, and often unique, product identifying information. As a result, the images that are returned, by the search engine, are very similar to one another in that the vast majority of the returned images are of the same product and, indeed, often the very same image itself, such as a promotional image provided by a manufacturer of the product. Some of the returned images, however, can be images that are not of the product. For example, the images that were returned by the search engine can include images that were improperly associated with the product. Others of the images that were returned by the search engine can include images that were meant to be placeholders, or indicators that no image of the product is available.

Traditional mechanisms for identifying images that are different from what the user would have expected rely on human intelligence to filter out such images. Even in situations where the user searches for a precisely identified product, and the responsive images are, for the most part, very similar to one another, the mechanisms for identifying those images that are not of the product that the user was searching for still rely on a human to ultimately make the decision of whether or not a particular image should be excluded from future search results directed to the same product.

SUMMARY

In one embodiment, automated mechanisms can identify, and remove, outlier images that differ substantially from other images. An initial set of images that are all believed to share a common element can be generated, such as, for example, by a search engine searching for images of a precisely identified product. The automated mechanisms can then filter that initial set of images to automatically remove of those images that differ substantially from other images, thereby automatically removing what the user would normally perceive as incorrect, or nonresponsive, images.

In another embodiment, one or more "penalty values" can be associated with each image and the automated determination of whether or not an image is an outlier, that substantially differs from other images and is to be filtered out, can be made based on these penalty values that are associated with each image. The automated determination can derive a threshold value, based on the penalty values that were associated with each image in a set of images. Images having penalty values beyond the derived threshold value can then be automatically filtered out as outlier images.

In a further embodiment, the derivation of a threshold value, for determining whether images are outlier images, can be adjustable to enable selection between greater filtering, with an increased possibility of images being improperly filtered out, and less filtering, with an increased possibility that images that were not filtered out should, in fact, have been filtered out.

In a still further embodiment, the determination of one or more penalty values to be associated with each image can be performed on a per-pixel basis. For each pixel in an image, a determination can be made of how different, from a predefined range, that pixel is. The individual pixel determinations can then be summed and the one or more penalty values to be associated with each image can be proportional to this sum and the number of pixels that were outside of a predefined range.

In a yet further embodiment, the determination of one or more penalty values to be associated with each image can be performed on a per-pixel basis, but pixels closer to the center of an image can be weighted more than pixels at the periphery of the image. Optionally, each image can be resized to a common size to simplify calculations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to mechanisms for automatically removing outlier images from a set of images, the outlier images being those images that differ substantially from the other images in the set. A set of images, such as a set of images that can have been found by a search engine in response to data entered by a user, can initially be processed to assign one or more "penalty values" to each image, in the set of images, that can quantify the difference between that image and an average image for the given set of images. Such penalty values can be calculated by first determining, for each pixel in an image, the difference between the color of that pixel and a predefined color range. Subsequently, the per-pixel values can be summed across all of the pixels of an image, and then multiplying by the number of pixels that are outside of the predefined color range. Such a calculation can be repeated for each component color of the image. Optionally, to derive a single penalty value the penalty values for each component color can be summed across the component colors. Outlier images can then be identified as those images whose assigned values are greater than a determined threshold. The threshold can be determined with reference to the set of values corresponding to the set of images, and can, optionally, include an adjustable sensitivity to select between a lower threshold, that can identify a greater number of images as outlier images, but which risks false positives that identify images as outlier images when they are not, in fact, outlier images, and a higher threshold that can identify a smaller number of images as outlier images, but which does so at a higher rate of accuracy.

For purposes of illustration, the techniques described herein make reference to typical scenarios, such as searching for images across multiple, interconnected computing devices, where the returned images are expected to have commonality. Such references, however, are strictly exemplary and are not intended to limit the mechanisms described to the specific examples provided. Indeed, the techniques described are applicable to any set of images where it is desirable to automatically remove, or filter out, those images that are substantially different from the remaining images in the set.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
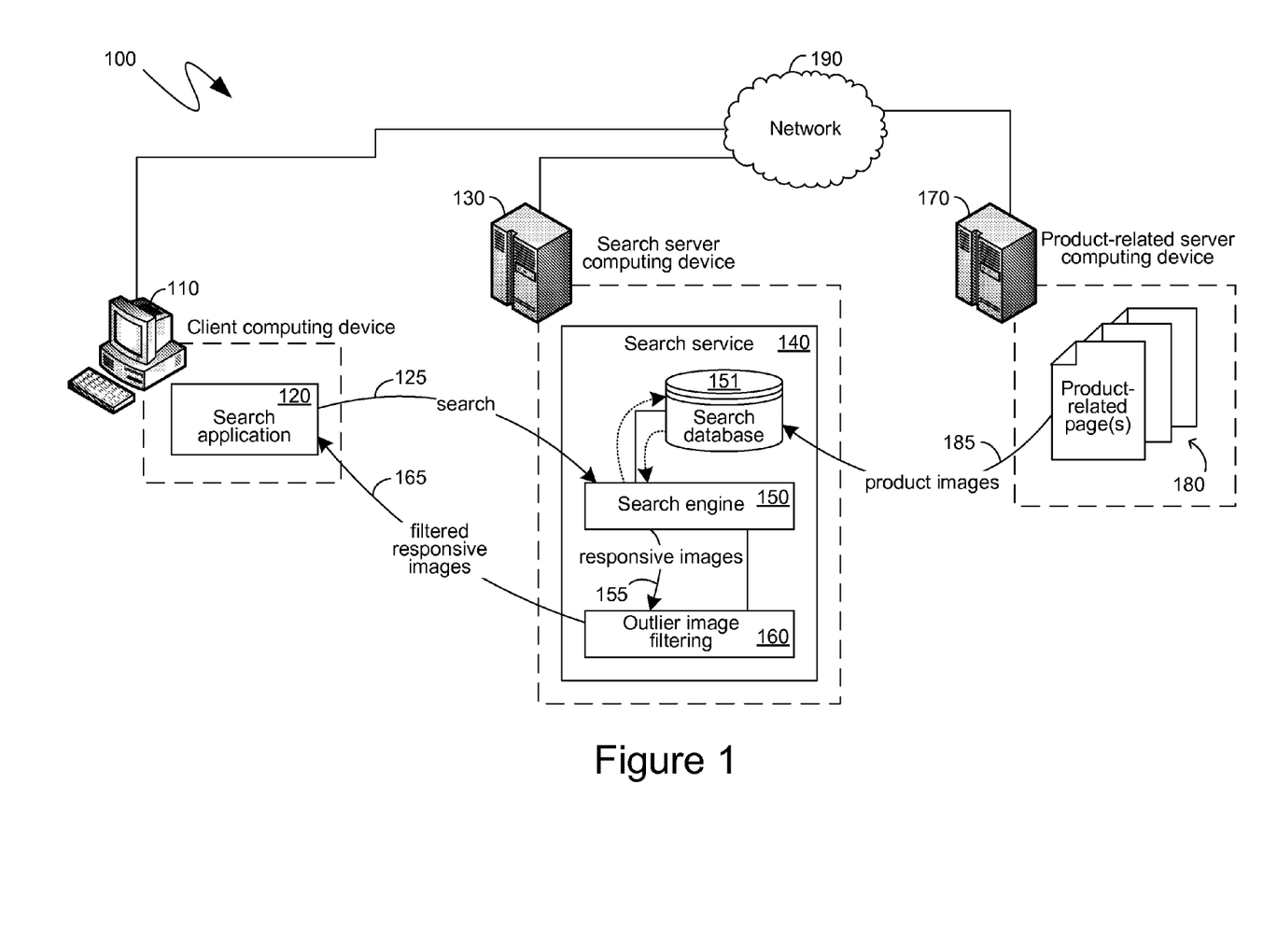
FIG. 1 is a block diagram of an exemplary network of computing devices.

Turning to FIG. 1, an exemplary system 100 is shown, comprising a client computing device 110, two server computing devices, namely the server computing devices 130 and 170, and the network 190 enabling communications between two or more of the client computing device 110 and the server computing devices 130 and 170. Although illustrated as separate server computing devices 130 and 170, the mechanisms described herein are equally applicable to independent processes executing on a single server computing device, or for configurations in which components in either device 130 or 170 are split among different servers. The mechanisms described herein are also applicable to virtualized server computing devices, such as can be created by one or more processes executing on either a single physical computing device or across multiple physical computing devices. Server computing devices 130 and 170, therefore, are meant to represent not just physical server computing devices, but also virtualized server computing devices, or any other like independent executing processes.

The client computing device 110, of the system 100 shown in FIG. 1, is illustrated as comprising a search application 120. In one embodiment, the search application 120 can be a dedicated application that provides a user of the client computing device 110 the ability to search the network 190, or otherwise provides a mechanism through which a user of the client computing device 110 can access one or more services being offered via the network 190. In an alternative embodiment, the search application 120 can be a general-purpose network browser that can simply be directed to, or otherwise utilize, a search service, such as that which could be provided by the search server computing device 130, which will be described in further detail below. Irrespective of whether the search application 120 is a dedicated application or a general-purpose browser, the search application 120 can communicate with a search engine 150 that can be hosted by one or more server computing devices, such as the search server computing device 130. As indicated previously, the automated detection and removal of outlier images is merely being presented within a network searching context to provide a convenient forum for understanding the descriptions below and is not meant to indicate that the mechanisms described are only limited to such a context.

A user of the mobile computing device 110 can utilize the search application 120 to, for example, search the network 190 for a particular product that the user wishes to purchase. The information entered into the search application 120, by the user of the client computing device 110, such as, for example, search terms, can be transmitted to the search engine 150 that is part of the search service 140 being executed by the search server computing device 130, as illustrated by the communication 125, shown in the system 100 of FIG. 1. Subsequently, the search engine 150 can reference a search database 151, such as in a manner well known to those skilled in the art, to identify one or more responsive entities that are accessible via the network 190. Typically, the search database 151 can comprise, not only textual information that can be compared to the search terms transmitted by the communication 125, but it can also comprise images, or links to images, that can be found, by the search engine 150, to be responsive to the search request transmitted by the communication 125.

For example, the search database 151 can comprise images, or links to images, from various product-related pages 180, which can be hosted on the network 190 by a product-related server computing device 170. As will be known by those skilled in the art, various search mechanisms, such as crawling, can be utilized by the search service 140 to obtain information regarding the product images contained in the product-related pages 180, and store such information in the search database 151, as is generally illustrated by the communication 185. Subsequently, were the user of the client computing device 110 to search for information regarding the product associated with the product-related pages 180, the search engine 150 could reference the search terms provided by the user, and transmitted via the communication 125, and could identify, via the search database 151, one or more product images, such as the product images received via the communication 185, and could deem such product images to be responsive images such as could be output from the search engine 150 via the communication 155.

To ensure that the products found by the search engine 150, in response to a user's query for such a product, are, in fact, the exact products that the user desired, the user can view the results identified by the search engine 150 in the form of images. Since the user is seeking a specific product, and has provided, such as via the communication 125, unique identifying information about that product, such as, for example, a product identifier, or trademarked product name, the user can reasonably expect that the results, as determined by the search engine 150, are to be directed to that product, and only that product. Consequently, any responsive images identified by the search engine 150 are, typically, expected by the user to be very similar images, since they are images of the same product. For example, if the user was utilizing the search engine 150 to search for the lowest price of a particular product that the user wished to purchase, the user could reference the responsive images identified by the search engine 150 to ensure that the prices that the user was comparing were, in fact, of the specific product that the user wishes to purchase, and not of some other, different, product that could have a vastly different pricing scheme and could result in the user misidentifying the actual lowest price of the product that the user sought to purchase. In such an example, it is likely that all of the images of the product that was sought by the user, and identified by the information the user provided via the communication 125, are going to be identical, or at least very similar, since they are likely to be marketing images provided by a manufacturer of the product, to resellers of the product, to place on those pages through which such resellers are selling the product. In many cases, images that are not of the particular product that the user was searching for are, instead, either images that were inadvertently associated with the particular product that the user was searching for, such as through an error in one or more of the product related pages 180, or are images that are meant to represent the lack of an actual image of the product, such as, for example, images bearing a symbol of a photograph in a grayed out color, or images that comprise a "no image" message.

In one embodiment, responsive images, as determined by the search engine 150, in response to the user's search query 125, can first be provided to an outlier image filtering 160 before being returned to the search application 120 and, thus, the user. The outlier image filtering 160 can, such as in the manner to be described in detail below, automatically identify outlier images from among the set of responsive images that were received from the search engine 150 via the communication 155. As utilized herein, the terms "outlier images" and "outliers" mean those images that are so substantially different from most of the images in a set of images that a human user would identify those images as being meaningfully different from most of the other images in that set of images. Thus, for example, within the context of a set of images that are deemed to be responsive to a users search, outlier images are those images that would likely be identified by the user as being something different than what the user was searching for. The outlier image filtering 160 can, again, as will be described in detail below, filter out such outlier images, and return, to the search application 120, those responsive images, from among the responsive images received from the search engine 150 via the communication 155, that more closely resemble one another. Such filtered responsive images can be provided by the outlier image filtering 160 to the search application 120 and, thus, the user, via the communication 165, as shown in the system 100 of FIG. 1.

Figure 2:
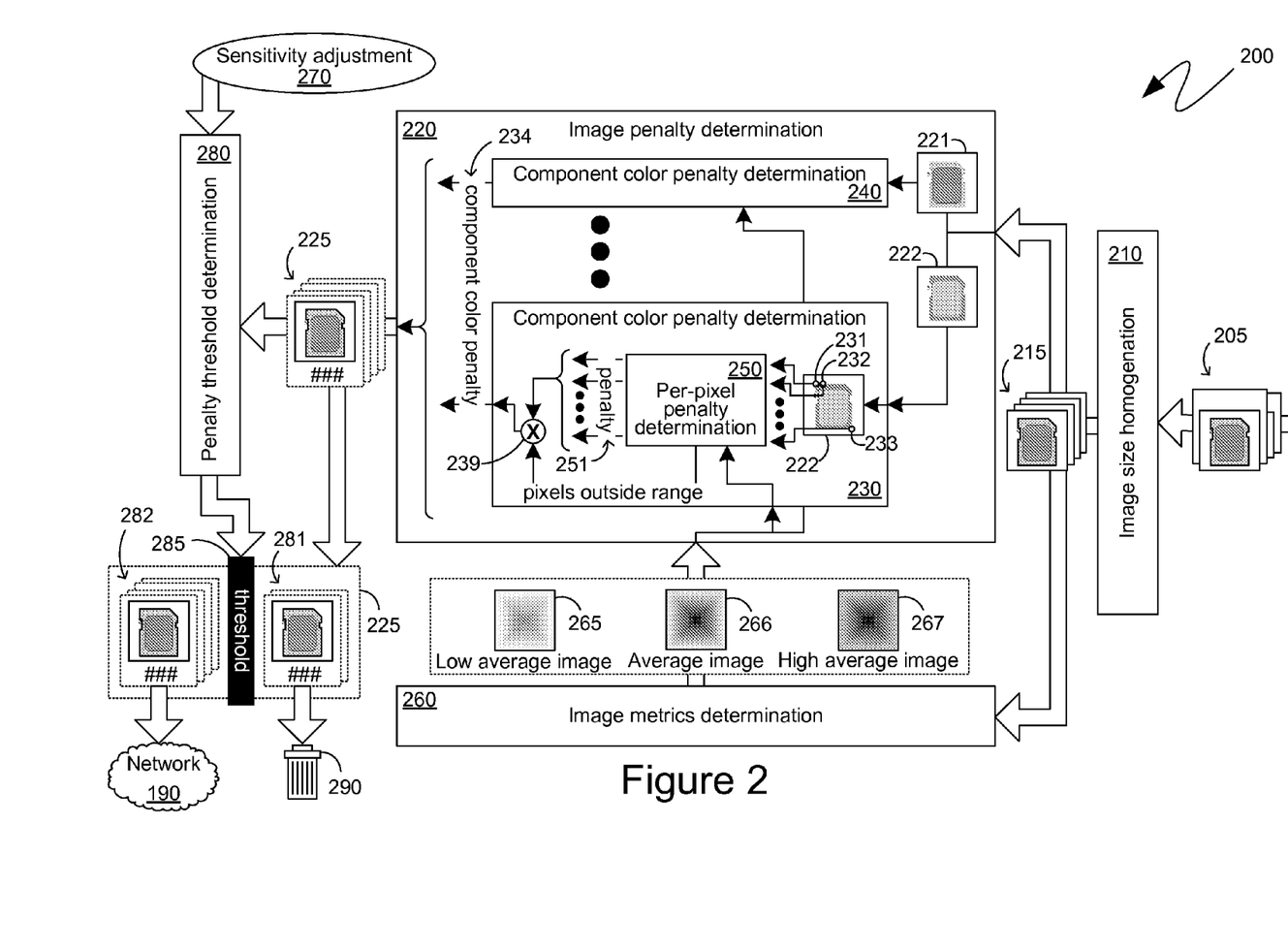
FIG. 2 is a block diagram of an exemplary outlier image filtering mechanism.

Turning to FIG. 2, the system 200 shown therein illustrates an exemplary series of components that can provide for the automated detection and filtering of outlier images. Initially, as shown on the right-hand side of FIG. 2, an initial set of images 205 can be received. In one embodiment, the initial set of images 205 may comprise images that are not equivalently sized. Consequently, in such an embodiment, an optional image size homogenation component 210 can be utilized to resize all of the images in the initial set of images 205 to a common size. Thus, as shown in the system 200 of FIG. 2, an equivalently sized set of images 215 can be output from the image size homogenation component 210. Subsequently, the equivalently sized images 215 can be provided to an image metrics determination component 260 that can utilize that set of images to determine an average image 266, a low average image 265 and a high average image 267. In one embodiment, the average image 266 can simply be the average of all of the equivalently sized images 215 that were provided to the image metrics determination component 260. More precisely, each pixel, in the average image 266, can have a color value that is the average color value for all corresponding pixels in the set of images 215. As will be recognized by those skilled in the art, digital image colors are often determined with reference to the values of one or more component colors. In such a case, the color for each pixel in the average image 266 can be determined by averaging, within each component color, the values of that component color for the corresponding pixel in each of the images of the set of images 215.

The low average image 265 and the high average image 267 can be those images that are one standard deviation below, and one standard deviation above, respectively, the average image 266. As will be recognized by those skilled in the art, a "standard deviation" is a commonly used measurement showing how much variation or dispersion there is in a set of values. Thus, the low average image 265 and the high average image 267 can represent the boundaries of a range of images that, colloquially, encompass "most" of the set of images 215. However, the utilization of one standard deviation is not required by any of the processes described further below. As such, the low average image 265 and the high average image 267 can be derived by other mechanisms that, similarly, establish the boundaries of a range that encompasses a substantial amount of the data points in a set of data.

As in the case of the derivation of the average image 266, the derivation of the low average image 265 and the high average image 267 can be done on a pixel-by-pixel basis, taking into account any component colors on which the color representation of the images may be based. More specifically, as indicated previously, an average color value for a pixel can be obtained by averaging the color values for corresponding pixels in each image of the set of images 215. As also indicated previously, such an averaging can be performed on a component color basis, such that the color value for each component color of a pixel in the average image 266 is obtained by averaging the component color values for corresponding component colors of corresponding pixels in each image of the set of images 215. In a similar manner, a standard deviation can be obtained on a pixel-by-pixel basis such that the standard deviation for a given pixel is based on the color values for corresponding pixels in each image of the set of images 215. Again, such a computation can be done on a per-component-color basis, such that a standard deviation is obtained for each component color of the set of images 215. Consequently, each component color of each pixel of the low average image 265 can have a component color value that is one standard deviation, for that component color for that pixel, lower then the component color value of the corresponding pixel in the average image 266. Similarly, each component color of each pixel of the high average image 267 can have a component color value that is one standard deviation, again, for that component color for that pixel, higher than the component color value of the corresponding pixel in the average image 266.

In addition to being provided to the image metrics determination component 260, the set of images 215 can also be provided to the image penalty determination component 220, as shown in the system 200 of FIG. 2. While the image metrics determination component 260 can utilize the entire set of images 215 so as to, for example, derive the average image 266, the low average image 265 and the high average image 267, such as in the manner described in detail above, the image penalty determination component 220 can process images, from the set of images 215, on an individual image basis.

As indicated previously, in one embodiment, the images of the set of images 215 can be defined by reference to component colors. For example, each pixel in each image of the set of images 215 can have its color defined by a 24-bit value, such that 24 bits of data are utilized to define the color that is assigned to each pixel. In one typical embodiment, the component colors of red, green and blue can be utilized such that, of the 24 bits of data that are utilized to define the color of each pixel, eight bits can be utilized to define the red component of the color of the pixel, another eight bits can be utilized to define the green component of the color of the pixel, and the final eight bits can be utilized to define the blue component of the color of the pixel. Other component colors are likewise possible. For example, images can be defined in terms of the component colors cyan, magenta, yellow and black. Similarly, other color representation mechanisms can be utilized. For example, colors can be expressed with reference to their hue, or intensity, their saturation and their lightness, brightness or intensity. Each of those can then be considered components of the color representation of images and individual pixels in an image. Thus, as utilized herein, the term "color" means any algorithmic or data representation of a perceived color, while the term "component color" means any component in terms of which individual colors can be expressed and represented. Irrespective of the actual component colors utilized, to the extent that an image is defined in terms of component colors, the image penalty determination component 220 can perform computations on each component color independently.

Thus, as shown in the system 200 of FIG. 2, the image penalty determination component 220 can comprise individual component color penalty determination elements, such as the component color penalty determination elements 230 and 240 such that each component color of the set of images 215 has a corresponding component color penalty determination element. As each image, of the set of images 215, is processed by the image penalty determination component 220, that image can first be divided into its component colors. Thus, for example, an image, from the set of images 215, is shown as being divided into a component color image 221 and another component color image 222 that are, respectively, provided to the component color penalty determination element 240 and the component color penalty determination element 230.

The processing performed by the component color penalty determination element 240 can be substantially identical to that performed by the component color penalty determination element 230 and, indeed, any other component color penalty determination element that would be utilized to process other component colors. For ease of illustration, therefore, FIG. 2 only shows the processing performed by the component color penalty determination element 230. Initially, as shown, the component color image 222 can be provided to a per-pixel penalty determination element 250 where a penalty value can be determined for each pixel of the component color image 222. For example, the pixel 231 can be processed by the per-pixel penalty determination element 250 to obtain a penalty value associated with that pixel.

The penalty value can be a measure of how different a data point is from other data points in a set of data points. Thus, in the case of the per-pixel penalty determination element 250, the penalty that is assigned by that element to each individual pixel can be a representation of how different that individual pixel is from corresponding pixels in the images 215. In one embodiment, the per-pixel penalty determination element 250 can determine a penalty value for a pixel, such as the pixel 231, by reference to the average image 266, low average image 265 and high average image 267. As indicated previously, the low average image 265 and the high average image 267 can represent the boundaries of a range that extends one standard deviation to either side of the average image 266. In one embodiment, the per-pixel penalty determination element 250 can determine a penalty value for a pixel, such as the pixel 231, based on the whether that pixel is within the range between the corresponding pixel in the low average image 265 and the corresponding pixel in the high average image 267, for the component color that is being analyzed by the component color penalty determination element 230. Thus, the color value of the pixel 231, for the component color that is being analyzed by the component color penalty determination element 230, can be compared to the color value of the corresponding pixel, again for the component color that is being analyzed, of the low average image 265 and the high average image 267. If the color value of the pixel 231, for that component color, is between the range established by the color value of the corresponding pixels of the low average image 265 and the high average image 267, again, for that component color, the per-pixel penalty determination element 250 can determine that the pixel 231 is not a penalty pixel and, consequently, comprises a penalty value of zero. If, however, the color value of the pixel 231, for the component color that is being analyzed, is either above or below the range established by the color value of the corresponding pixels of the low average image 265 and the high average image 267, again for that component color, the per-pixel penalty determination element 250 can assign, to the pixel 231, a penalty value equal to how far away the color value of the pixel 231 is from the established range. Thus, if the color value of the pixel 231 is less than the color value of the corresponding pixel in the low average image 265, for the component color that is being analyzed, then the penalty value that will be assigned by the per-pixel penalty determination element 250, to the pixel 231, can be the difference between the color value of the pixel 231 and the color value of the corresponding pixel in the low average image 265, again for the component color that is being analyzed. Similarly, if the color value of the pixel 231 is more than the color value of the corresponding pixel in the high average image 267, for the component color that is being analyzed, then the penalty value that will be assigned by the per-pixel penalty determination element 250, to the pixel 231, can be the difference between the color value of the pixel 231 and the color value of the corresponding pixel in the high average image 267, again for the component color that is being analyzed.

The processing of the component color penalty determination element 230 can continue in a like manner for all subsequent pixels of the component color image 222, such as, for example, for the pixel 232 and so on until the pixel 233 at the end of the component color image 222 is reached, as shown in FIG. 2. The resulting penalty values 251 can then be summed together by the component color penalty determination element 230. In one embodiment, as shown by the system 200 of FIG. 2, the resulting sum of the penalties can then be multiplied by the component color penalty determination element 230 with the number of pixels found by the per-pixel penalty determination element 250 to be outside of the above-described range, as indicated by the multiplication element 239.

Such a component color penalty determination can be repeated by the component color penalty determination element 240, and any other component color penalty determination elements that would be associated with the other component colors of the images 215. In one embodiment, the resulting component color penalties 234 can then be summed together by the image penalty determination component 220 to obtain a single penalty value that can be associated with the image being processed by the image penalty determination components 220. Consequently, as shown in the system 200 of FIG. 2, the set of images 215 can be processed by the image penalty determination component 220 to derive a set of images 225 where each image is associated with a value that represents an indication of how different that image is from other images in the set of images. In another embodiment, however, the resulting component color penalties 234 can be utilized independently and the below described processing can be performed independently for each component color. In such an embodiment, different thresholds can be established, such as in the manner described in detail below, independently for each component color. An image, in such an embodiment, can be identified as an outlier image on the basis of whether the individual component color penalties of such an image are beyond the established component-color-specific thresholds. For example, an image can be considered an outlier image if all individual component color penalties of such an image are beyond the established component-color-specific thresholds or, alternatively, an image can be considered an outlier image only if one or more individual component color penalties of such an image are beyond the established component-color-specific thresholds.

In one embodiment, the image penalty determination component 220 can weight different pixels of an image differently, such that penalty values associated with certain pixels are increased, while penalty values associated with other pixels are decreased. For example, pixels near the periphery of an image are likely to be less important than pixels near the center of an image, when it comes to user perception. Thus, absent weighting, identical images, except where one image is displayed on a colored background, while another image is displayed on a white background, can result in the image being displayed on a colored background being found to be an outlier when, in fact, that image is of the exact same product as most of the other images, and perhaps some different image should have been classified as an outlier. To account for such differences, a weighting function can be utilized such that the penalty determined by, for example, the per-pixel penalty determination element 250 can be reduced if the pixel is located near the periphery of an image. For example, in one embodiment, the penalty determined by the per-pixel penalty determination element 250 can be divided by the distance between the pixel being analyzed and the center of the image. In another embodiment, the penalty determined can be divided by the square of the distance between the pixel being analyzed in the center of the image. Other amortization functions that decrease the value of the penalty as the distance between the pixel being analyzed and the center of the image increases can likewise be utilized.

Once a set of images 225 with associated penalty values, including total penalty values or per-component-color penalty values, is generated by the image penalty determination component 220, that set of images can be divided into outlier images 281 and core images 282 based upon the penalty values associated with each image in the set of images 225. In one embodiment, the set of penalty values, of the set of images 225, can be provided to a penalty threshold determination component 280 to determine a threshold 285 that will be utilized to differentiate between the outlier images 281 and the core images 282. Due to the manner in which the penalty values were obtained, each image can comprise a positive, or zero, valued penalty value, even if the image is comprised of pixels whose color values were less than the color values of, for example, corresponding pixels in the low average image 265. Consequently, the penalty threshold determination component 280 can receive a set of penalties that are positively valued.

In one embodiment, the penalty threshold determination component 280 can determine an average penalty value and a standard deviation for the penalty; again, either a total penalty, as illustrated by the system 200 of FIG. 2, or individually for each component color penalty value. The threshold penalty value 285, again, either totally or per-component-color, can then be established to be a multiple of standard deviations greater than the average penalty value. For example, in one embodiment, the number of standard deviations added to the average penalty value to obtain the threshold penalty value 285 can be determined by dividing the standard deviation by the average and then raising the number "2" to a power equal to that quotient. As can be seen, the multiple of standard deviation added to the average penalty value to obtain the threshold penalty value 285 can be less than one, such that less than one standard deviation is added to the average penalty value to obtain the threshold penalty value 285.

In another embodiment, a sensitivity adjustment 270 can be provided to the penalty threshold determination component 280 to enable the sensitivity with which outlier images are identified to be adjusted. For example, the sensitivity could be increased, resulting in a greater number of images, of the set of images 225, being identified as outlier images 281. However, such an increase in sensitivity could also result in a greater number of the outlier images 281 being improperly so designated. For example, within the previously described context of the search, where a user has searched for a particular product, and increased sensitivity, the sensitivity adjustment 270, could result in outlier images 281 comprising images that are, in fact, of the product for which the user was searching. Conversely, the sensitivity could be decreased resulting in a fewer number of images, of the set of images 225, being identified as outlier images 281. In such a case, while the outlier images 281 are more likely to be images that do not fit with the other set of images, such as, for example, within the previously described context, the outlier images 281 could, in fact, be images that are not of the product for which the user was searching. Conversely, however, more of the core images 282 could, with such a decreased sensitivity, include images that should, properly, have been classified as outlier images.

In one embodiment, the sensitivity adjustment 270 can either increase or decrease the multiple of standard deviations that are added to the average penalty value, by the penalty threshold determination component 280, to obtain the threshold penalty value 285. For example, the sensitivity adjustment 270 can control the value of a variable that is added to the above described mechanism for determining what multiple of standard deviations will be added to the average penalty value to obtain the threshold penalty value 285. If the sensitivity adjustment 270 is increased, that variable can be a positive value that, as a result, can increase the resulting threshold penalty value 285, thereby resulting in a lower sensitivity to differences among the set of images 225, and a smaller number of outlier images 281. Conversely, the sensitivity adjustment 270 could be decreased, and the variable controlled by the sensitivity adjustment 270 can be a negative value that, as a result, decreases the threshold penalty value 285, thereby further resulting in an increased sensitivity to differences among the set of images 225, and a greater number of outlier images 281.

In one embodiment, the sensitivity adjustment 270 can be controlled through a presented user interface element. For example, returning to the above described context, where a user is receiving a set of images as a response to a search result, the above-described mechanisms can be applied automatically to filter out outlier images from among the set of images initially identified by, for example, a search engine, as being responsive to the user's query. From the user's perspective, however, because such a filtering can have occurred automatically and prior to any images being delivered to the user, the user cannot be aware of what images were filtered out as outliers. One or more sliders or similar user-controllable interface elements could be presented, together with the filtered images, to enable a user to dynamically adjust the sensitivity adjustment 270 of the automated image outlier filtering being applied. As a result, the image outlier filtering being applied can be dynamically changed, based on the new threshold penalty values being derived as a result of the user's modification of the sensitivity adjustment 270, thereby providing the user with a dynamically updated set of filtered images.

Returning back to the operation of the system 200 of FIG. 2, once the threshold penalty value 285 is determined by the penalty threshold determination component 280, the set of images 225 can be divided into outlier images 281, and core images 282, according to whether the penalty values associated with each image are above, or below, the threshold penalty value 285, respectively. In the previously described example, where automated outlier image filtering is utilized within the context of presenting images to a user that are deemed to be responsive to the user's query, the outlier images 281 can be automatically discarded, as illustrated by the trash icon 290 in FIG. 2, while the core images 282 can be transmitted to the user, such as via the network 190.

Additionally, as will be recognized by those skilled in the art, the components described and illustrated in the system 200 of FIG. 2 are exemplary and are meant to illustrate one conceptual division of the above described mechanisms. But the descriptions provided herein can be equally implemented by other componentizations and conceptual divisions. For example, rather than dividing an image into its component colors initially, and then determining a penalty on a per-component-color basis, the image penalty determination component 220 could employ a per-pixel penalty determination that divides each pixel into its component color elements, obtains a per-component-color penalty for each individual pixel, sums those per-component-color penalties to achieve a penalty for that one pixel and then proceeds to derive an overall image penalty based on those per-pixel penalties. Similarly, rather than employing an image metrics determination component 260 that can derive an average image 266, a low average image 265 and a high average image 267, the image penalty determination component 220 could derive the relevant average, high and low values on a per-pixel basis as it processed each pixel of an image.

Figure 3:
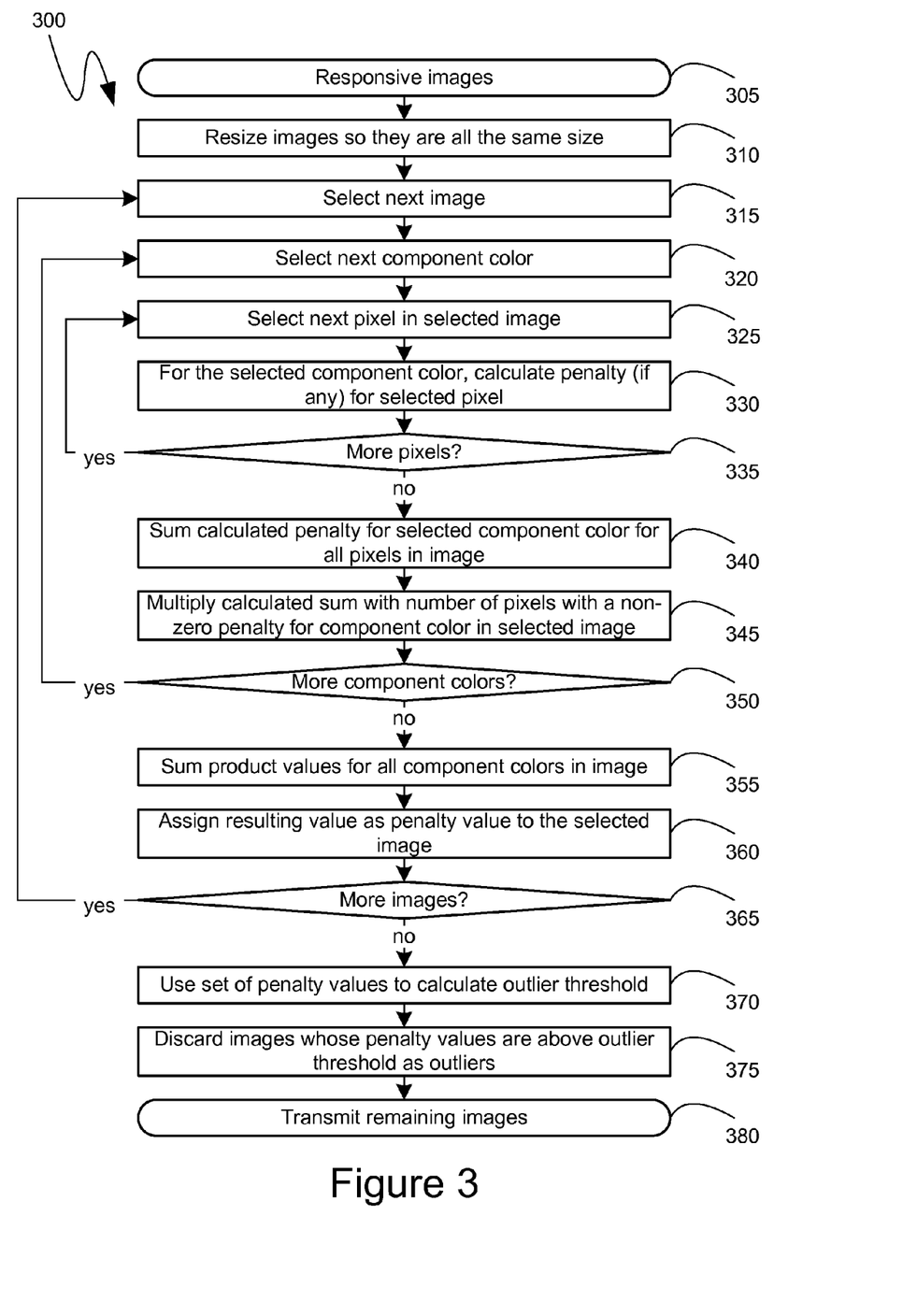
FIG. 3 is a flow diagram of an exemplary operation of an outlier image filtering mechanism.

Turning to FIG. 3, the flow diagram 300 shown therein illustrates an exemplary series of steps that can be performed by an automated outlier image determination mechanism. Initially, as shown by the flow diagram 300 of FIG. 3, a set of images can be received at step 305. As indicated previously, the set of images received at step 305 can be images deemed by a search engine to be responsive to a search query entered by a user. Subsequently, at step 310, the images can be optionally resized so that they are all the same size, or, more specifically, so that the height and width of each image comprises the same number of pixels, or other image quanta.

At step 315, an image, from the set of images that was received at step 305, can be selected. At step 320, one component color of that image can be selected, and, at step 325 a pixel in that image can be selected. Subsequently, at step 330, a penalty value for the pixel selected at step 325, and for the component color of that pixel that was selected at step 320, can be determined. As indicated previously, in one embodiment, the penalty determination can be based on the difference between the color value of the pixel selected at step 325, for the component color selected at step 320, and a predefined range of color values for that component color, for that pixel. Thus, if, for the component color selected at step 320, the color value of the pixel selected at step 325 is within the predefined range for that component color, for that pixel, then at step 330, the calculated penalty can be zero. Alternatively, if the color value of the component color selected at step 320, for the pixel selected at step 325, is above the predefined range, the penalty calculated at step 330 can be the difference between the color value for the component color for that pixel and the upper limit of the predefined range. Similarly, if the color value of the component color selected at step 320, for the pixel selected in step 325, is below the predefined range, the penalty calculated at step 330 can be the difference between the color value for the component color for that pixel and the lower limit of the predefined range.

Once the penalty has been calculated, at step 330, for the pixel selected at step 325, a determination can be made, at step 335, as to whether there are any further pixels of the image, selected at step 315, that require processing. If, at step 335, it is determined that there are additional pixels, processing can return to step 325 and proceed with the cultivation of the penalty at step 330. If, however, at step 335, it is determined that all of the pixels of the image, selected at step 315, have already been processed, then processing can proceed to step 340, at which point the penalties calculated at step 330, for all of the pixels of the image selected at step 315, can be summed together. Subsequently, at step 345, the sum calculated at step 340 can be multiplied with the number of pixels that were outside of the range, as determined at step 330, for the particular component color that was selected at step 320. Processing can then proceed to step 350, at which point determination can be made as to whether there are any additional component colors in the image selected in step 315. If, at step 350, it is determined that there are additional component colors, processing can return to step 320 and the above-described steps can be performed again, except now with a new component color that was selected with the return to step 320.

If, however, at step 350, it is determined that all of the component colors of the image selected in step 315 have already been processed, processing can proceed to step 355, at which point the penalty values, for each component color, that were obtained at step 345 can be optionally summed together. As indicated previously, in another embodiment, multiple penalty values can be assigned to a single image, such as per-component-color penalty values, such as were calculated at step 345. At step 360, the result of the summation at step 355, or, optionally, the individual per-component-color penalty values from step 345, can be assigned to the image selected in step 315 as the penalty values associated with that image. Subsequently, processing can proceed to step 365 to determine whether there are any additional images, in the set of images received at step 305, that have yet to have penalty values determined for them, and associated with them. If, at step 365, it is determined that there are additional images, processing can proceed to step 315 and another image, from among the set of images received at step 305, can be selected. The above-described steps, for determining and assigning a penalty value to an image, can then be repeated for the newly selected image.

Once, at step 365, it is determined that there are no further images, from among the set of images received at step 305, for which penalty values are to be determined, processing can proceed to step 370, where an outlier threshold can be determined based on the penalty values that were determined at step 360 for the images of the set of images received at step 305. As indicated previously, the determination of an outlier threshold, at step 370, can be based on an average of the penalty values that were determined at step 360 for the images of the set of images received at step 305, and can also be based on a standard deviation of those penalty values. In one embodiment, the threshold determined at step 370 can be determined by adding a multiple of standard deviations to the average penalty value. In another embodiment, the threshold penalty value determination at step 370 can be informed by a sensitivity adjustment that can modify the amount of standard deviations added to the average penalty value to derive the threshold penalty value. Such a sensitivity adjustment can increase, or decrease, the sensitivity to differences among the set of images received at step 305, such as in the manner described in detail above. Subsequently, at step 375, those images whose penalty values are above the outlier threshold, as determined at step 370, can be discarded and, at step 380, the remaining images can be transmitted, or otherwise provided, in place of the set of images that was received at step 305. As indicated previously, if multiple penalty values were assigned to each individual image, then, at step 375, the termination of which images are outlier images can be based on whether one or more penalty values assigned to those images are above respective threshold values.

Figure 4:
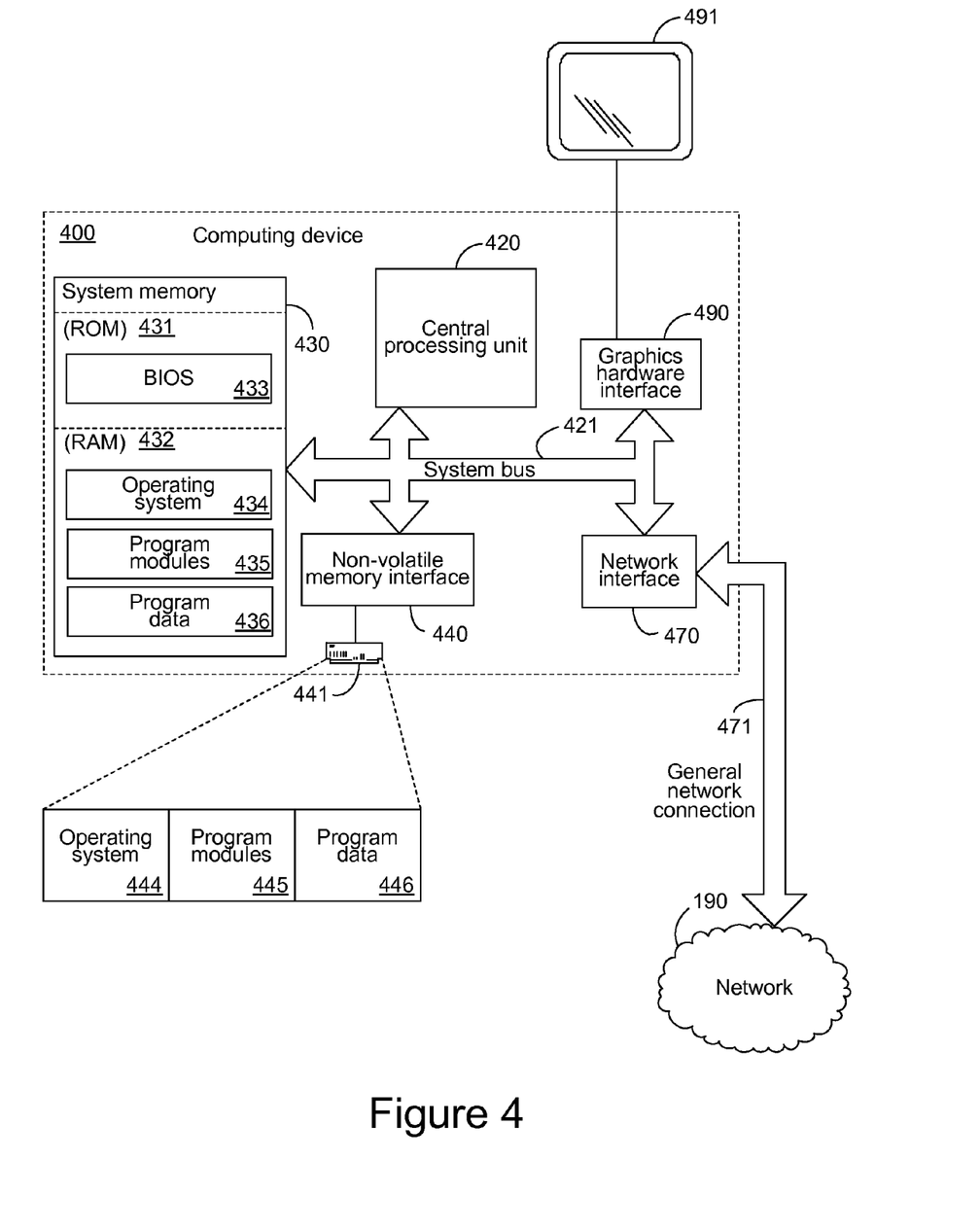
FIG. 4 is a block diagram of an exemplary computing device.

Turning to FIG. 4, an exemplary computing device 400 is illustrated. The exemplary computing device 400 can be any one or more of the client computing device 110 and the server computing devices 130 and 170 illustrated in FIG. 1, whose operations were described in detail above. For example, the exemplary computing device 400 can be a server computing device or a computing device that can be executing one or more processes that can represent the server computing devices 130 and 170 illustrated in FIG. 1, such as, for example, by executing one or more processes that create virtual computing environments that can provide for the operations detailed above. The exemplary computing device 400 of FIG. 4 can include, but is not limited to, one or more central processing units (CPUs) 420, a system memory 430, that can include RAM 432, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, such as for the display of visual user interfaces, including, but not limited to, a graphics hardware interface 490 and a display device 491. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and the aforementioned RAM 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates the operating system 434 along with other program modules 435, and program data 436.

The computing device 400 may also include other removable/non-removable, volatile/nonvolatile computer storage media. By way of example only, FIG. 4 illustrates the hard disk drive 441 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 can operate in a networked environment using logical connections to one or more remote computers. The computing device 400 is illustrated as being connected to the general network connection 471 through a network interface or adapter 470 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

As can be seen from the above descriptions, mechanisms for automatically identifying outlier images have been presented. In view of the many possible variations of the subject matter described herein, we claim as our invention all such embodiments as may come within the scope of the following claims and equivalents thereto.

We claim:

1. One or more hardware computer-readable storage media comprising computer-executable instructions for automatically identifying outlier images in a set of images, the computer-executable instructions performing steps comprising:
   selecting a pixel in an image from the set of images;
   generating an average color value for the selected pixel by averaging color values for corresponding pixels in other images from the set of images;
   establishing a color value range around the generated average color value for the selected pixel, the established color value range being based on the color values for the corresponding pixels in the other images from the set of images;
   generating a per-pixel penalty value for the selected pixel based on a difference between a color value of the selected pixel and a threshold color value of the established color value range for the selected pixel that is closest to the color value of the selected pixel if the color value of the selected pixel is outside of the established color value range for the selected pixel;
   setting the per-pixel penalty value for the selected pixel to zero if the color value of the selected pixel is within the established color value range for the selected pixel;
   repeating, for other pixels in the image, the selecting, the generating the average color value, the establishing, the generating the per-pixel penalty value and the setting the per-pixel penalty value;
   generating an image penalty value for the image from the set of images based on a sum of the generated per-pixel penalty values for pixels in the image;
   generating a threshold penalty value based on the generated image penalty values;
   identifying, as the outlier images, images having the image penalty value greater than the threshold penalty value.

2. The hardware computer-readable storage media of claim 1, wherein the computer-executable instructions for generating the threshold penalty value comprise computer-executable instructions for: generating an average penalty value by averaging the generated image penalty values; determining a standard deviation of the generated image penalty values; and generating the threshold penalty value by adding a multiple of the standard deviation to the average penalty value.

3. The hardware computer-readable storage media of claim 1, wherein the computer-executable instructions for generating the threshold penalty value comprise computer-executable instructions for: receiving a sensitivity adjustment value and generating the threshold penalty value in accordance with the sensitivity adjustment value, such that a higher sensitivity adjustment value results in a higher threshold penalty value and a lower sensitivity adjustment value results in a lower threshold penalty value.

4. The hardware computer-readable storage media of claim 1, wherein the computer-executable instructions for generating the image penalty value comprise computer-executable instructions for generating the image penalty value based on a product of a number of pixels in the image having non-zero per-pixel penalty values and the sum of the generated per-pixel penalty values.

5. The hardware computer-readable storage media of claim 1, wherein the average color value for the selected pixel comprises average color values for each component color of the selected pixel; and wherein further the computer-executable instructions for generating the per-pixel penalty value comprise computer-executable instructions for generating a per-pixel penalty value for each of the component colors and summing the generated per-pixel penalty values for each of the component colors to generate the per-pixel penalty value for the selected pixel.

6. The hardware computer-readable storage media of claim 1, wherein the computer-executable instructions for generating the per-pixel penalty value for the selected pixel comprise computer-executable instructions for amortizing the difference between the color value of the selected pixel and the average color value for the selected pixel based on a distance between the selected pixel and a center of the image.

7. The hardware computer-readable storage media of claim 1, comprising further computer-executable instructions for resizing images in the set of images to a common image size.

8. A method for automatically identifying outlier images in a set of images, the method comprising the steps of:
   selecting a pixel in an image from the set of images;

generating an average color value for the selected pixel by averaging color values for corresponding pixels in other images from the set of images;

establishing a color value range around the generated average color value for the selected pixel, the established color value range being based on the color values for the corresponding pixels in the other images from the set of images;

generating a per-pixel penalty value for the selected pixel based on a difference between a color value of the selected pixel and a threshold color value of the established color value range for the selected pixel that is closest to the color value of the selected pixel if the color value of the selected pixel is outside of the established color value range for the selected pixel;

setting the per-pixel penalty value for the selected pixel to zero if the color value of the selected pixel is within the established color value range for the selected pixel;

repeating, for other pixels in the image, the selecting, the generating the average color value, the establishing, the generating the per-pixel penalty value and the setting the per-pixel penalty value;

generating an image penalty value for the image from the set of images based on a sum of the generated per-pixel penalty values for pixels in the image;

generating a threshold penalty value based on the generated image penalty values;

identifying, as the outlier images, images having the image penalty value greater than the threshold penalty value.

9. The method of claim 8, wherein the generating the threshold penalty value comprises: generating an average penalty value by averaging the generated image penalty values; determining a standard deviation of the generated image penalty values; and generating the threshold penalty value by adding a multiple of the standard deviation to the average penalty value.

10. The method of claim 8, wherein the generating the threshold penalty value comprises: receiving a sensitivity adjustment value and generating the threshold penalty value in accordance with the sensitivity adjustment value, such that a higher sensitivity adjustment value results in a higher threshold penalty value and a lower sensitivity adjustment value results in a lower threshold penalty value.

11. The method of claim 8, wherein the generating the image penalty value comprises generating the image penalty value based on a product of a number of pixels in the image having non-zero per-pixel penalty values and the sum of the generated per-pixel penalty values.

12. The method of claim 8, wherein the average color value for the selected pixel comprises average color values for each component color of the selected pixel; and wherein further the generating the per-pixel penalty value comprises generating a per-pixel penalty value for each of the component colors and summing the generated per-pixel penalty values for each of the component colors to generate the per-pixel penalty value for the selected pixel.

13. The method of claim 8, wherein the generating the per-pixel penalty value for the selected pixel comprises amortizing the difference between the color value of the selected pixel and the average color value for the selected pixel based on a distance between the selected pixel and a center of the image.

14. The method of claim 8, further comprising the step of resizing images in the set of images to a common image size.

15. A user interface generated on a display device by computing device, the user interface comprising:
a user-controllable interface element for modifying a sensitivity adjustment value; and
a dynamically updated set of images comprising those images, from among an initial set of images, that are associated with penalty values less than a threshold penalty value that is determined by increasing an average penalty value by an amount based on the sensitivity adjustment value, the set of images being dynamically updated in response to modifications to the sensitivity adjustment value;
wherein a penalty value associated with an image is determined by performing steps comprising:
selecting a pixel in the image;
generating an average color value for the selected pixel by averaging color values for corresponding pixels in other images from the initial set of images;
establishing a color value range around the generated average color value for the selected pixel, the established color value range being based on the color values for the corresponding pixels in the other images from the initial set of images;
generating a per-pixel penalty value for the selected pixel based on a difference between a color value of the selected pixel and a threshold color value of the established color value range for the selected pixel that is closest to the color value of the selected pixel if the color value of the selected pixel is outside of the established color value range for the selected pixel;
setting the per-pixel penalty value for the selected pixel to zero if the color value of the selected pixel is within the established color value range for the selected pixel;
repeating, for other pixels in the image, the selecting, the generating the average color value, the establishing, the generating the per-pixel penalty value and the setting the per-pixel penalty value; and
generating the penalty value associated with the image based on a sum of the generated per-pixel penalty values for pixels in the image.

16. The user interface of claim 15, wherein the generating the penalty value associated with the image comprises generating the penalty value associated with the image based on a product of a number of pixels in the image having non-zero per-pixel penalty values and the sum of the generated per-pixel penalty values.

17. The user interface of claim 15, wherein the average color value for the selected pixel comprises average color values for each component color of the selected pixel; and wherein further the generating the per-pixel penalty value comprises generating a per-pixel penalty value for each of the component colors and summing the generated per-pixel penalty values for each of the component colors to generate the per-pixel penalty value for the selected pixel.

18. The user interface of claim 15, wherein the generating the per-pixel penalty value for the selected pixel comprises amortizing the difference between the color value of the selected pixel and the average color value for the selected pixel based on a distance between the selected pixel and a center of the image.

19. The user interface of claim 15, wherein images in the initial set of images are resized to a common image size prior to the determination of penalty values associated with the images.

* * * * *